April 13, 1965     C. E. HENDERSHOT     3,177,855
INTERNAL COMBUSTION ENGINE ARRANGEMENT
Filed July 25, 1963     2 Sheets-Sheet 1
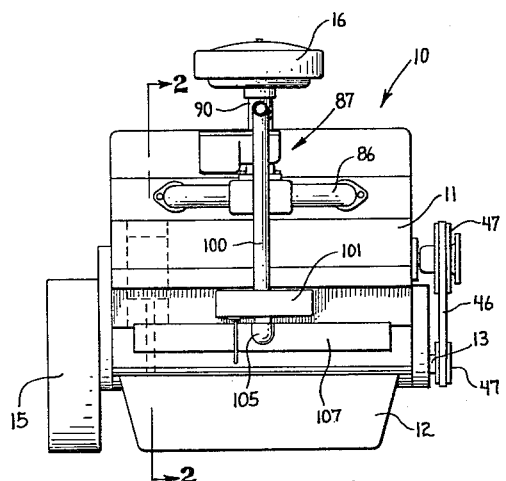
Fig. 1.
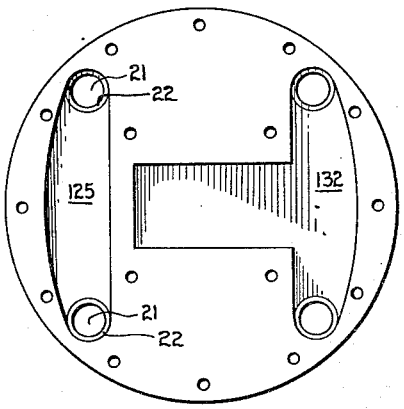
Fig. 3.
Fig. 5.
Fig. 4.
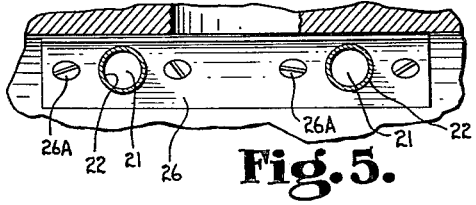
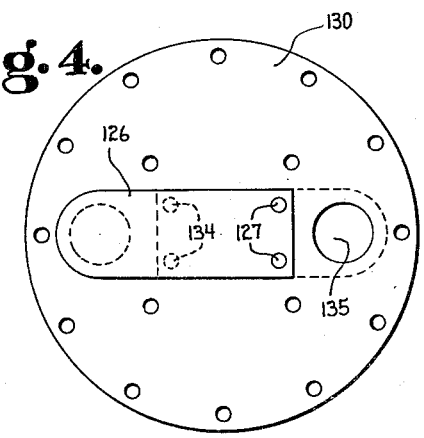
Fig. 7.
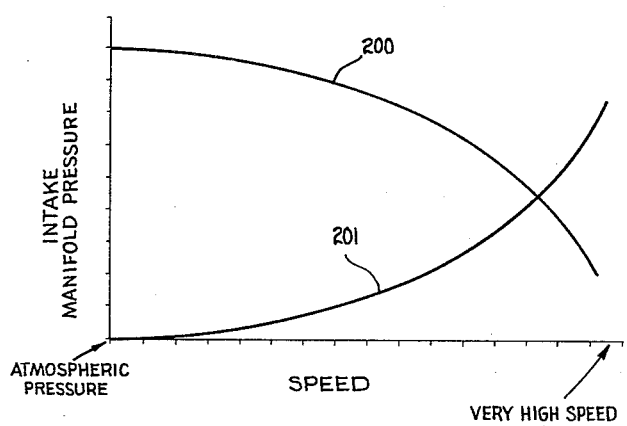
Fig. 6.
INVENTOR.
CHARLES E. HENDERSHOT
BY
Lockwood, Woodard, Smith & Weikart
Attorneys INVENTOR.
CHARLES E. HENDERSHOT
BY
Lockwood, Woodard, Smith & Weikart
Attorneys

United States Patent Office 3,177,855
Patented Apr. 13, 1965

3,177,855
INTERNAL COMBUSTION ENGINE
ARRANGEMENT
Charles E. Hendershot, Nashville, Ind., assignor of thirty-one percent to Alfred M. Suggs, Indianapolis, Ind.; thirty-one percent to Ernest W. Ogle, Nashville, Ind.; one percent to Laurent Gredy, one percent to Laurence L. Walker, and one-half percent to Robert M. Seibel, all of Nashville, Ind.; one-half percent to Harold G. Miller, Columbus, Ind.; and one percent to Mitchell Turner Preston, one percent to Max W. Loop, and one percent to Kenneth Dale Schneider, all of Nashville, Ind.
Filed July 25, 1963, Ser. No. 297,653
7 Claims. (Cl. 123—59)

The present invention relates to an improved internal combustion engine.

A primary object of the invention is to provide an improved internal combustion engine.

Superchargers for internal combustion engines are well known but do not always provide the results desired. For example, one well known presently available semi-sports car is optionally equipped with a supercharger which gives substantial supercharging action only at very high speeds. One object of the present invention is to provide an internal combustion engine with a supercharging action which gives excellent operation at very low speeds. One obvious advantage or use of such an arrangement is in sport or racing cars requiring high acceleration at relatively low speeds.

Present day automobile engines do not completely burn their fuel which results in the production of gases and vapors containing unburned fuel and called "blow-by." These escaping gases produce "smog" and the like which is a well known problem in such cities as Los Angeles, California. Approximately one-half of this blow-by results from gases and vapors escaping past the engine pistons into the oil sump and out the breather tube of the engine. Another object of the present invention is to provide an internal combustion engine which incorporates means for eliminating or reducing "blow-by."

Still another object of the present invention is to provide an internal combustion engine which can be easily and conveniently produced by relatively minor modifications of a conventional internal combustion engine.

A further object of the present invention is to provide an internal combustion engine which incorporates a supercharger capable of being easily turned on or off so that the supercharging action need be used only when the power requirements in a given situation are high whereby a smaller engine may be used for a given application.

Related objects and advantages will become apparent as the description proceeds.

One embodiment of the present invention might include an internal combustion engine comprising an even plurality of cylinders each including a cylinder head, a plurality of movable pistons each reciprocably received within a respective one of said cylinders and including a piston head and a piston skirt, a plurality of stationary pistons each fixed with relation to a respective cylinder and received in the piston skirt of the respective cylinder, each piston head being located between a respective fixed piston and cylinder head, each of said cylinders and respective movable pistons defining a combustion chamber, each of said movable pistons and respective fixed pistons defining a compression chamber, a pair of check valves mounted in each stationary piston, one of said check valves permitting flow from atmosphere into the respective compression chamber but blocking flow from the respective compression chamber to atmopshere, a carburetor, a pressure manifold mounted on said crankcase, a baffle box containing a plurality of baffles for collecting moisture and causing it to flow downwardly, an oil duct leading from said baffle box into said crankcase, an intake manifold for said cylinders, an exhaust manifold for said cylinders, a plurality of first conduits leading from respective stationary pistons to said pressure manifold, a second conduit leading from said pressure manifold to the bottom of said baffle box, the other of said check valves blocking flow from said first conduit into said compression chamber but permitting flow from said compression chamber into said first conduit, a third conduit leading from the top of said baffle box to said carburetor, and inlet and exhaust valves controlling flow between said combustion chambers and the intake and exhaust manifolds respectively.

The full nature of the invention will be understood from the accompanying drawings and the following description and claims.

FIG. 1 is a side elevation of a four cylinder engine embodying the present invention.

FIG. 3 is an enlarged plan view of the head of a stationary piston forming a part of the structure of FIG. 2 showing the head with the retainer plate removed.

FIG. 4 is a top plan view identical to FIG. 3 but showing the stationary piston head with the retainer plate secured in place.

FIG. 5 is an enlarged section taken along the line 5—5 of FIG. 2 in the direction of the arrows.

FIG. 6 is a graph of engine speed plotted against intake manifold pressure for the engine of the present invention and for a centrifugal type supercharged internal combustion engine.

FIG. 7 is a fragmentary side elevation similar to FIG. 1 but showing the opposite side of an alternative embodiment of the engine.

Figure 2:
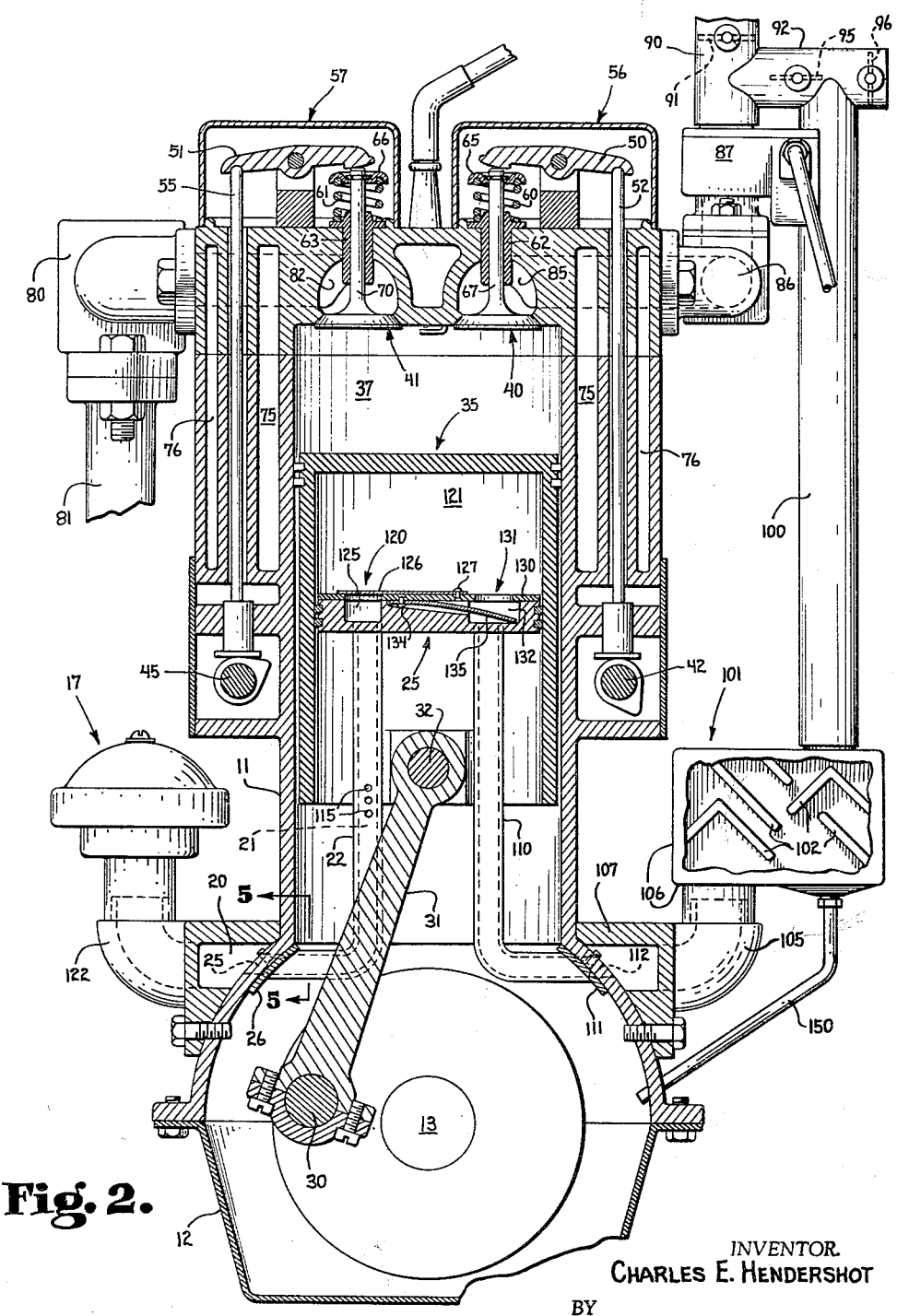
FIG. 2 is an enlarged vertical section taken along the line 2—2 of FIG. 1 in the direction of the arrows.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring more particularly to the drawings, in FIG. 1 there is illustrated an internal combustion engine 10 which includes the usual crankcase 11, oil sump 12 and crankshaft 13. Power is taken off from the engine by means of suitable gearing received within gear box 15 fixed to the crankcase. The engine is provided with a conventional air cleaner 16 and with a further air filter or cleaner 17 (FIG. 2).

Referring more particularly to FIG. 2 as well as FIG. 1, the air filter 17 is mounted upon an air intake manifold 20 fixed to the crankcase 11 of the engine. The air intake manifold extends along the length of the engine and communicates with pasages 21 within conduits 22 through passages 25 in the sidewall of the crankcase. Each pair of conduits 22 acts also as two of the mounting posts for a respective one of stationary pistons 25 and is fixed to the crankcase by means of a respective mounting plate 26, screws 26A being used to fix the mounting plates in place.

The engine is provided with the usual crankthrow 30, connecting rods 31, wrist pins 32 and pistons 35. It should be noted that each piston 35 is formed internally at 36 with a cylindrical shape which along with the stationary piston 25 defines a compression chamber. Each of the four cylinders 37 is provided with an intake valve 40 and an exhaust valve 41. The intake valves 40 are all operated by means of a cam shaft 42 which is separate from the cam shaft 45 provided for the exhaust valves 41. It should be understood, however, that, if desired, a single cam shaft can be used for the intake and exhaust valves. The cam shafts 42 and 45 are positively connected for rotation with the crankshaft 13 by means of a chain 46 and sprockets 47.

The valves 40 and 41 are operated from the cam shafts 42 and 45 through standard rocker arms 50 and 51 and push rods 52 and 55. Protective covers 56 and 57 are provided for the overhead valves 40 and 41. The valves 40 and 41 are yieldably retained in a closed position by means of springs 60 and 61 which bear against bearings 62 and 63 and also bear against retainers 65 and 66 fixed to the valve stems 67 and 70.

The engine is cooled in conventional manner by liquid coolant received within passages 75 and 76 in the walls of the crankcase. A conventional exhaust manifold 80 is fixed to the crankcase and has an exhaust pipe 81 secured thereto and in communication therewith. The exhaust manifold 80 is in communication with exhaust passage 82 provided for each of the four cylinders 37 and exhaust valves 41.

A plurality of passages 85 is provided in the block, each passage leading to a respective one of the four intake valves 40 from an intake manifold 86 fixed to the crankcase of the engine. A conventional carburetor 87 is mounted upon the intake manifold 86 and receives air in conventional manner from the air filter 16 through air inlet conduit 90. A butterfly valve 91 is mounted within the air conduit 90 and may be closed when the engine is in supercharged operation. A conduit 92 intersects the conduit 90 and has mounted therein butterfly valves 95 and 96. The butterfly valve 95 is used to shut off the supercharger. The butterfly valve 96 is closed when the supercharger is in operation and opened when the engine is in non-supercharged operation to provide a breather for the supercharger. A conduit 100 is fixed to the top of a baffle box 101 and leads into the conduit 92 between the butterfly valves 95 and 96. The baffle box 101 contains a plurality of baffles 102 which function to cause condensation or collection of oil and vapors being pumped through the conduit 105 into the baffle box 101. The conduit 105 is secured to the bottom 106 of the baffle box and communicates with a pressure manifold 107 fixed to the crankcase and extending substantially the length there.

Each of the stationary pistons 25 is provided with a pair of conduits 110 which also act as mounting posts similarly to the posts 22. The conduits 110 are fixed at one end to the stationary piston 25 and at the other end to plates 111 fixed to the inside of the crankcase. Each pair of posts 110 has a single plate 111 fixed thereto. The plate 111 is substantially identical to the plate 26 above described and illustrated in FIG. 5. The conduits 110 are in communication with the pressure manifold 107 through apertures 112 in the wall of the crankcase.

Each of the conduits or posts 22 may be provided with a plurality of openings 115 to draw the crankcase fumes and blow-by from the combustion chamber into the conduit 22.

The internal combustion engine of the present invention operates in conventional manner except as described below. Operation and structure of a single cylinder will be described with the understanding that all cylinders operate identically but in the equal periodically timed sequence of a standard four cycle, four cylinder engine. As the piston 35 rises on a discharge stroke, the check valve 120 is opened and air flows into the compression chamber 121 through the air filter 17, the conduit 122, the manifold 20, the conduits 22 and the passage 125 in the piston 25. It will be noted from FIG. 3 that the two conduits 22 for each stationary piston 25 lead into the passage 125. The check valve 120 includes a leaf spring 126 which is fixed to the piston 25 by rivets 127. When the air pressure within the compression chamber 121 is less than the atmospheric pressure, the leaf valve 126 opens allowing air to enter the compression chamber. This air intake operation occurs until the piston 35 reaches the top of its stroke and begins to move downwardly.

The stationary piston 25 is provided with the further check valve 131 which controls flow of air under pressure from the compression chamber 121 into the mounting posts or conduits 110. Within the piston 25 is a passage 132 which communicates with both of the conduits 110 and receives the leaf spring 135. When the pressure within the conduit 110 is greater than the pressure within the compression chamber 121, the leaf spring 135 is forced upwardly against the cover plate 130 closing the valve 131. However, as the piston 35 moves downwardly, the pressure within the compression chamber 121 becomes greater than the pressure within the conduit 110 and the leaf spring 135 is forced downwardly opening the valve 131 and permitting air under pressure to flow into the two conduits 110 associated with the piston. The leaf spring 135 is fixed to the retainer plate 130 by rivets 134.

It will be noted that because of the fact that there are four pistons in the engine, one of the pistons is always moving downwardly in its combustion stroke compressing air and pumping it into the pressure manifold 107 while simultaneously another of the pistons is moving downwardly in its intake stroke also compressing air and pumping it into the pressure manifold 107. When said two pistons 35 are moving upwardly, the other two pistons are moving downwardly. Consequently, the air pressure within the air manifold 107 will be maintained at a relatively constant level approximately twice that of atmosphere. In an embodiment of the invention using only one cylinder, it will probably be necessary to provide the engine with an accumulator arrangement for smoothing out the air pressure supplied resulting from the intermittent bursts of air pressure provided from the compression chamber. It should be mentioned, however, that the various conduits 105, 100, 92 and 90, the baffle box 101 and associated conduits fulfill the function of an accumulator even if only one cylinder is present.

Because of the fact that the air which is compressed in the compression chamber 121 contains oil fumes which are aspirated through the openings 115, the baffles 102 act to collect the oil from these oil fumes and to cause it to drip to the bottom of the box 101. The oil then drains away into the crankcase through the conduit 150. The pressurized air with the oil removed passes thence through the conduits 100, 92 and 90 to the carburetor 87 where vaporized gasoline is mixed therewith in conventional manner. The thus produced combustible charge moves from the carburetor to the intake manifold 86 and passages 85 into the combustion chamber 37, the intake valves 40 operating in conventional manner. The charge which is so supplied is at an increased pressure whereby the engine is supercharged.

It has been found that the supercharger of the present invention provides two volumes of air for each inlet stroke of the engine and thus greatly increases the power of the engine. The graph of FIG. 6 indicates the operation of the present device. The line 200 indicates that as the speed of the engine increases, the intake manifold pressure and supercharging effect decreases. It will be noted, however, that at relatively slow speeds, full supercharging is provided. The action of a centrifugal supercharger is indicated by the graph 201, such centrifugal superchargers being used, for example, in the Chevrolet Corvair automobile. At relatively low speeds, no supercharging action is provided. The automobile must attain relatively high speeds of the order of 60 miles an hour or more before the full supercharging action can be appreciated.

From the above description, it will be appreciated that the present invention provides an internal combustion engine which incorporates a supercharging action giving excellent operation at very low speeds. It will also be evident that the present invention provides an internal combustion engine incorporating improved means for eliminating or reducing blow-by. It will further be evident that the present invention provides an internal combustion engine which can be easily and conveniently produced by relatively minor modifications of a conventional internal combustion engine. Referring to FIG. 2, it will be appreciated that the shape of the piston and the crankcase of the standard engine remain either identically as they were prior to the modification of the present invention or require only slight changes to adapt them for use with the present invention.

FIG. 7 illustrates an alternative embodiment of the invention which involves the recycling of a portion of the exhaust gases through the engine for the purpose of burning some of the unburnt particles in the exhaust and thereby removing some of the obnoxious carbon monoxide from the exhaust. It will be noted that the embodiment of FIG. 7 is identical to that described above except that the exhaust pipe 81' is forked and a portion 81A thereof discharges into the manifold 20'.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. An internal combustion engine comprising a crankcase and an even plurality of cylinders each including a cylinder head, a plurality of movable pistons each reciprocably received within a respective one of said cylinders and including a piston head and a piston skirt, a plurality of stationary pistons each fixed with relation to a respective cylinder and received in the piston skirt of the respective cylinder, each piston head being located between a respective fixed piston and cylinder head, each of said cylinders and respective movable pistons defining a combustion chamber, each of said movable pistons and respective fixed pistons defining a compression chamber, a pair of check valves mounted in each stationary piston, one of said check valves permitting flow from atmosphere into the respective compression chamber but blocking flow from the respective compression chamber to atmosphere, a carburetor, a pressure manifold mounted on said crankcase, a baffle box containing a plurality of baffles for collecting moisture and causing it to flow downwardly, an oil duct leading from said baffle box into said crankcase, an intake manifold for said cylinders, an exhaust manifold for said cylinders, a plurality of first conduits leading from respective stationary pistons to said pressure manifold, a second conduit leading from said manifold to the bottom of said baffle box, the other of said check valves blocking flow from respective first conduits into said compression chamber but permitting flow from said compression chamber into the respective first conduits, a third conduit, a fourth conduit, said third conduit leading from the top of said baffle box to said fourth conduit, said fourth conduit leading from said third conduit to said carburetor, means for porting said third conduit to atmosphere, means for closing off said fourth conduit, means for porting said carburetor to atmosphere, a conduit leading from said carburetor to said intake manifold, and inlet and exhaust valves controlling flow between said combustion chambers and the intake and exhaust manifolds respectively.

2. An internal combustion engine comprising a crankcase and a plurality of cylinders each including a cylinder head, a plurality of movable pistons each reciprocably received within a respective one of said cylinders and including a piston head and a piston skirt, a plurality of stationary pistons each fixed with relation to a respective cylinder and received in the piston skirt of the respective cylinder, each piston head being located between a respective fixed piston and cylinder head, each of said cylinders and respective movable pistons defining a combustion chamber, each of said movable pistons and respective fixed pistons defining a compression chamber, a pair of check valves mounted in each stationary piston, one of said check valves permitting flow from atmosphere into the respective compression chamber but blocking flow from the respective compression chamber to atmosphere, a carburetor, a pressure manifold mounted on said crankcase, a baffle box containing a plurality of baffles for collecting moisture and causing it to flow downwardly, an oil duct leading from said baffle box into said crankcase, an intake manifold for said cylinders, an exhaust manifold for said cylinders, a plurality of first conduits leading from respective stationary pistons to said pressure manifold, a second conduit leading from said pressure manifold to the bottom of said baffle box, the other of said check valves blocking flow from respective first conduits into said compression chamber but permitting flow from said compression chamber into the respective first conduits, a third conduit leading from the top of said baffle box to said carburetor, a conduit leading from said carburetor to said intake manifold, and inlet and exhaust valves controlling flow between said combustion chambers and the intake and exhaust manifolds respectively.

3. An internal combustion engine comprising a crankcase and a cylinder including a cylinder head, a movable piston reciprocably received within said cylinder and including a piston head and a piston skirt, a stationary piston fixed with relation to said cylinder and received in the piston skirt, said piston head being located between said fixed piston and cylinder head, said cylinder and movable piston defining a combustion chamber, said movable piston and fixed piston defining a compression chamber, a pair of check valves mounted in said stationary piston, one of said check valves permitting flow from atomsphere into said compression chamber but blocking flow from said compression chamber to atmosphere, a carburetor, a baffle box containing a plurality of baffles for collecting moisture and causing it to flow downwardly, an oil duct leading from said baffle box into said crankcase, an intake manifold for said cylinder, an exhaust manifold for said cylinder, a first conduit leading from said piston to the bottom of said baffle box, the other of said check valves blocking flow from said first conduit into said compression chamber but permitting flow from said compression chamber into said first conduit, a second conduit leading from the top of said baffle box to said carburetor, a conduit leading from said carburetor to said intake manifold, and inlet and exhaust valves controlling flow between said combustion chamber and the intake and exhaust manifolds respectively.

4. An internal combustion engine comprising a crankcase and a cylinder including a cylinder head, a movable piston reciprocably received within said cylinder and including a piston head and a piston skirt, a stationary piston fixed with relation to said cylinder and received in the piston skirt, said piston head being located between said fixed piston and said cylinder head, said cylinder and movable piston defining a combustion chamber, said movable piston and fixed piston defining a compression chamber, a pair of check valves mounted in said stationary piston, an air intake conduit leading from outside of said crank case through said crank case to one of said check valves, blow-by receiving openings in the wall of said air intake conduit leading from inside said crankcase to the inside of said air intake conduit, said one check valve permitting flow from atmosphere into said compression chamber but blocking flow from said compression chamber to atmosphere, a carburetor, first conduit means leading from said stationary piston and the other of said check valves to said carburetor, said other check valve permitting flow from said compression chamber into said first conduit means but blocking flow from said first conduit means into said compression chamber, an intake manifold for said cylinder, an exhaust manifold for said cylinder, second conduit means leading from said carburetor to said intake manifold, and inlet and exhaust valves controlling flow between said combustion chamber and the intake and exhaust manifolds respectively.

5. An internal combustion engine comprising a crankcase and a plurality of cylinders each including a cylinder head, a plurality of movable pistons each reciprocably received within a respective one of said cylinders and including a piston head and a piston skirt, a plurality of stationary pistons each fixed with relation to a respective cylinder and received in the piston skirt of the respective cylinder, each piston head being located between a respective fixed piston and cylinder head, each of said cylinders and respective movable pistons defining a combustion chamber, each of said movable pistons and respective fixed pistons defining a compression chamber, a pair of check valves mounted in each stationary piston, one of said check valves permitting flow from atmosphere into the respective compression chamber but blocking flow from the respective compression chamber to atmosphere, a carburetor, a pressure manifold mounted on said crankcase, a baffle box containing a plurality of baffles for collecting moisture and causing it to flow downwardly, an oil duct leading from said baffle box into said crankcase, an intake manifold for said cylinders, an exhaust manifold for said cylinders, a plurality of first conduits leading from respective stationary pistons to said pressure manifold, a single second conduit communicating with said pressure manifold and with the bottom of said baffle box for receipt of compressed air from a plurality of said first conduits for delivery of the compressed air at a relatively constant pressure to said baffle box, the other of said check valves blocking flow from respective first conduits into said compression chamber but permitting flow from said compression chamber into the respective first conduits, a third conduit leading from the top of said baffle box to said carburetor, a conduit leading from said carburetor to said intake manifold, and inlet and exhaust valves controlling flow between said combustion chambers and the intake and exhaust manifolds respectively.

6. An internal combustion engine comprising a crankcase and a plurality of cylinders each including a cylinder head, a plurality of movable pistons each reciprocably received within a respective one of said cylinders and including a piston head and a piston skirt, a plurality of stationary pistons each fixed with relation to a respective cylinder and received in the piston skirt of the respective cylinder, each piston head being located between a respective fixed piston and cylinder head, each of said cylinders and respective movable pistons defining a combustion chamber, each of said movable pistons and respective fixed pistons defining a compression chamber, a pair of check valves mounted in each stationary piston, one of said check valves comprising a leaf valve which opens to permit flow from atmosphere into the respective compression chamber and which closes to block flow from the respective compression chamber to atmosphere, a carburetor, a pressure manifold mounted on said crankcase, a baffle box containing a plurality of baffles for collecting moisture and causing it to flow downwardly, an oil duct leading from said baffle box into said crankcase, an intake manifold for said cylinders, an exhaust manifold for said cylinders, a plurality of first conduits leadings from respective stationary pistons to said pressure manifold, a second conduit leading from said pressure manifold to the bottom of said baffle box, the other of said check valves comprising a leaf valve which closes to block flow from respective first conduits into said compression chamber and which opens to permit flow from said compression chamber into the respective first conduits, a third conduit leading from the top of said baffle box to said carburetor, a conduit leading from said carburetor to said intake manifold, and inlet and exhaust valves controlling flow between said combustion chambers and the intake and exhaust manifolds respectively.

7. An internal combustion engine comprising a crankcase and a cylinder including a cylinder head, a movable piston reciprocably received within said cylinder and including a piston head and a piston skirt, a stationary piston fixed with relation to said cylinder and received in the piston skirt, said piston head being located between said fixed piston and cylinder head, said cylinder and movable piston defining a combustion chamber, said movable piston and fixed piston defining a compression chamber, a pair of check valves mounted in said stationary piston, one of said check valves comprising a leaf valve which opens to permit flow from atmosphere into said compression chamber and which closes to block flow from said compression chamber to atmosphere, a carburetor, a baffle box containing a plurality of baffles for collecting moisture and causing it to flow downwardly, an oil duct leading from said baffle box into said crankcase, an intake manifold for said cylinder, an exhaust manifold for said cylinder, a first conduit leading from said piston to the bottom of said baffle box, the other of said check valves comprising a leaf valve which closes to block flow from said first conduit into said compression chamber and which opens to permit flow from said compression chamber into said first conduit, a second conduit leading from the top of said baffle box to said carburetor, a conduit leading from said carburetor to said intake manifold, and inlet and exhaust valves controlling flow between said combustion chamber and the intake and exhaust manifolds respectively.

References Cited by the Examiner
UNITED STATES PATENTS

| 1,420,266 | 6/22 | Knox. | |
| 1,630,841 | 5/27 | Fusch | 163—74 |
| 1,858,126 | 5/32 | Wood | 123—74 |
| 1,895,381 | 1/33 | Genety | 123—119 |

FOREIGN PATENTS

| 559,649 | 6/23 | France. |
| 133,085 | 10/19 | Great Britain. |

FRED E. ENGELTHALER, *Primary Examiner.*